(12) United States Patent
Donovan et al.

(10) Patent No.: US 7,779,072 B2
(45) Date of Patent: *Aug. 17, 2010

(54) SIP-BASED FEATURE CONTROL

(75) Inventors: Steven R Donovan, Plano, TX (US); Raghavan Devanathan, Plano, TX (US)

(73) Assignee: Verizon Business Global LLC, Basking Ridge, NJ (US)

( * ) Notice: Subject to any disclaimer, the term of this patent is extended or adjusted under 35 U.S.C. 154(b) by 941 days.

This patent is subject to a terminal disclaimer.

(21) Appl. No.: 10/440,539

(22) Filed: May 16, 2003

(65) Prior Publication Data

US 2003/0200260 A1 Oct. 23, 2003

Related U.S. Application Data

(63) Continuation of application No. 09/436,793, filed on Nov. 8, 1999, now Pat. No. 6,615,236.

(51) Int. Cl.
*G06F 15/173* (2006.01)

(52) U.S. Cl. ...................................... 709/204

(58) Field of Classification Search ................ 709/203, 709/227, 230
See application file for complete search history.

(56) References Cited

U.S. PATENT DOCUMENTS

| | | | |
|---|---|---|---|
| 4,817,085 A | 3/1989 | De Prycker | |
| 5,077,732 A | 12/1991 | Fischer et al. | |
| 5,303,286 A | 4/1994 | Wiedeman | |
| 5,353,335 A | 10/1994 | D'Urso et al. | |
| 5,434,907 A | 7/1995 | Hurst et al. | |
| 5,467,343 A | 11/1995 | Lee et al. | |
| 5,664,009 A | 9/1997 | Hurst et al. | |
| 5,680,116 A | 10/1997 | Hashimoto et al. | |
| 5,691,986 A | 11/1997 | Pearlstein | |
| 5,699,359 A | 12/1997 | Suga | |
| 5,732,219 A | 3/1998 | Blumer et al. | |
| 5,742,763 A | 4/1998 | Jones | |
| 5,745,556 A | 4/1998 | Ronen | |
| 5,768,361 A | 6/1998 | Cowgill | |
| 5,794,039 A | 8/1998 | Guck | |
| 5,802,510 A | 9/1998 | Jones | |
| 5,826,039 A | 10/1998 | Jones | |
| 5,832,221 A | 11/1998 | Jones | |
| 5,859,898 A | 1/1999 | Checco | |

(Continued)

FOREIGN PATENT DOCUMENTS

CN 1207226 2/1999

(Continued)

OTHER PUBLICATIONS

Rosenberg et al., "Programming Internet Telephony Services", IEEE Network, IEEE Inc., New York, US, vol. 13, No. 1, May 1999, pp. 42-49.

(Continued)

*Primary Examiner*—David Y Eng

(57) ABSTRACT

A system and method for providing an addition to the Session Initiation Protocol is disclosed. The addition is a new field header, preferably entitled "Feature", that is added to the REGISTER message. This field would contain control information for various feature services, like the Do Not Disturb feature and other services provided by traditional PBX systems.

25 Claims, 2 Drawing Sheets

U.S. PATENT DOCUMENTS

| | | | |
|---|---|---|---|
| 5,864,610 | A | 1/1999 | Ronen |
| 5,867,494 | A | 2/1999 | Krishnaswamy et al. |
| 5,867,495 | A | 2/1999 | Elliott et al. |
| 5,883,894 | A | 3/1999 | Patel et al. |
| 5,889,774 | A | 3/1999 | Mirashrafi et al. |
| 5,907,547 | A | 5/1999 | Foladate et al. |
| 5,913,176 | A | 6/1999 | Barabash |
| 5,923,659 | A | 7/1999 | Curry et al. |
| 5,930,348 | A | 7/1999 | Regnier et al. |
| 5,951,638 | A | 9/1999 | Hoss et al. |
| 5,953,504 | A | 9/1999 | Sokal et al. |
| 5,956,391 | A | 9/1999 | Melen et al. |
| 5,958,005 | A | 9/1999 | Thorne et al. |
| 5,999,525 | A | 12/1999 | Krishnaswamy et al. |
| 6,067,442 | A | 5/2000 | Wiedeman et al. |
| 6,069,890 | A | 5/2000 | White et al. |
| 6,084,952 | A | 7/2000 | Beerman, Jr. et al. |
| 6,094,525 | A | 7/2000 | Perlman et al. |
| 6,094,578 | A | 7/2000 | Purcell et al. |
| 6,134,235 | A | 10/2000 | Goldman et al. |
| 6,137,869 | A | 10/2000 | Voit et al. |
| 6,151,390 | A | 11/2000 | Volftsun et al. |
| 6,151,629 | A | 11/2000 | Trewitt |
| 6,157,648 | A | 12/2000 | Voit et al. |
| 6,163,536 | A | 12/2000 | Dunn et al. |
| 6,201,858 | B1 | 3/2001 | Sundhar |
| 6,202,081 | B1 | 3/2001 | Naudus |
| 6,215,858 | B1 | 4/2001 | Bartholomew et al. |
| 6,226,364 | B1 | 5/2001 | O'Neil |
| 6,233,318 | B1 | 5/2001 | Picard et al. |
| 6,240,391 | B1 | 5/2001 | Ball et al. |
| 6,240,449 | B1 | 5/2001 | Nadeau |
| 6,253,249 | B1 | 6/2001 | Belzile |
| 6,259,914 | B1 | 7/2001 | Koster |
| 6,278,707 | B1 | 8/2001 | MacMillan |
| 6,282,270 | B1 | 8/2001 | Porter |
| 6,295,291 | B1 * | 9/2001 | Larkins ............... 370/352 |
| 6,301,609 | B1 | 10/2001 | Aravamudan et al. |
| 6,331,986 | B1 | 12/2001 | Mitra et al. |
| 6,333,931 | B1 | 12/2001 | LaPier et al. |
| 6,335,927 | B1 | 1/2002 | Elliott et al. |
| 6,335,968 | B1 | 1/2002 | Malik |
| 6,339,594 | B1 | 1/2002 | Civanlar et al. |
| 6,363,053 | B1 | 3/2002 | Schuster et al. |
| 6,366,576 | B1 | 4/2002 | Haga |
| 6,370,120 | B1 | 4/2002 | Hardy |
| 6,381,316 | B2 | 4/2002 | Joyce et al. |
| 6,393,269 | B1 | 5/2002 | Hartmaier et al. |
| 6,404,746 | B1 | 6/2002 | Cave et al. |
| 6,404,870 | B1 | 6/2002 | Kia et al. |
| 6,411,705 | B2 | 6/2002 | Oran et al. |
| 6,426,955 | B1 | 7/2002 | Dalton et al. |
| 6,434,143 | B1 | 8/2002 | Donovan |
| 6,453,034 | B1 | 9/2002 | Donovan et al. |
| 6,463,053 | B1 | 10/2002 | Chen |
| 6,487,283 | B2 | 11/2002 | Thomas et al. |
| 6,507,647 | B1 | 1/2003 | Mandalia |
| 6,515,997 | B1 | 2/2003 | Feltner et al. |
| 6,519,242 | B1 * | 2/2003 | Emery et al. ............ 370/338 |
| 6,529,499 | B1 | 3/2003 | Doshi et al. |
| 6,567,399 | B1 | 5/2003 | Schuster et al. |
| 6,570,869 | B1 | 5/2003 | Shankar et al. |
| 6,584,093 | B1 | 6/2003 | Salama et al. |
| 6,584,110 | B1 | 6/2003 | Mizuta et al. |
| 6,600,735 | B1 | 7/2003 | Iwama et al. |
| 6,631,186 | B1 * | 10/2003 | Adams et al. .......... 379/201.12 |
| 6,633,571 | B1 | 10/2003 | Sakamoto |
| 6,650,901 | B1 * | 11/2003 | Schuster et al. .......... 455/456.1 |
| 6,658,022 | B1 | 12/2003 | West et al. |
| 6,674,745 | B1 | 1/2004 | Schuster et al. |
| 6,681,252 | B1 * | 1/2004 | Schuster et al. ............ 709/227 |
| 6,687,221 | B1 | 2/2004 | Kurose et al. |
| 6,744,759 | B1 * | 6/2004 | Sidhu et al. ............... 370/356 |
| 6,760,324 | B1 | 7/2004 | Scott et al. |
| 6,779,032 | B1 | 8/2004 | Hericourt |
| 6,937,563 | B2 * | 8/2005 | Preston et al. ............ 370/230 |
| 6,954,654 | B2 * | 10/2005 | Ejzak ....................... 455/560 |
| 7,005,985 | B1 | 2/2006 | Steeves |
| 2002/0167943 | A1 | 11/2002 | Hakim et al. |

FOREIGN PATENT DOCUMENTS

| | | |
|---|---|---|
| EP | 0794650 | 9/1997 |
| EP | 0123456 | 1/2000 |
| WO | 97/16007 | 5/1997 |
| WO | 97/16916 | 5/1997 |
| WO | 97/22210 | 6/1997 |
| WO | 97/23078 | 6/1997 |
| WO | 98/21874 | 5/1998 |

OTHER PUBLICATIONS

Lennox et al., "Transporting User Control Information in SIP Register Payloads", Internet Engineering Task Force, Feb. 23, 1999, pp. 1-9.

Zimmerer, Eric, "SIP+ (Inter MGC Protocol); Edition 0.0", Level 3 Communications, Dec. 4, 1998, pp. 1-20.

Schulzrinne et al., "RTP Payload for DTMF Digits, Telephony Tones and Telephony Signals", Internet Engineering Task Force, Jun. 9, 1999, 21 pages.

Woods, D., "Translating Menus at the VOIP Café", Dec. 27, 1999; pp. 1-4.

Schulzrinne, H., "The Session Initiation Protocol (SIP)", www.os.columbia.edu/~hgs, Sep. 28, 2000, pp. 1-111.

Rosenberg, "SIP: Past, Present and Future", www.dynamicsoft.com, May 10, 2000, 28 pages.

Wedlund, E., et al., "Mobility Support Using SIP," ACM 1999, pp. 76-82.

Sijben, P. et al., "Toward the PSTN/Internet Inter-Networking: Media Device Control Protocol," Internet Engineering Task Force, Version .03, Feb. 9, 1999.

Schulzrinne, et al., "The Session Initiation Protocol: Internet-Centric Signaling," IEEE Communications Magazine, Oct. 2000, pp. 134-141.

Schulzrinne, et al. "Signaling for Internet Telephony," IEEE Oct. 13, 1998, pp. 298-307.

Schulzrinne, H., "A Comprehensive Multimedia Control Architecture for the Internet," IEEE, 1997, pp. 65-76.

Rosenberg, J., et al., "Internet Telephony Gateway Location," IEEE, Feb. 1998, pp. 488-496.

Cable Television Laboratories, Inc., "PacketCable CMS to CMS Signaling Specification," pp. 1-153, Nov. 28, 2000.

Marshall, et al., "SIP Proxy-to-Proxy Extensions for Supporting DCS," Sip Working Group Internet Draft, pp. 1-24, Nov. 2000.

Handley, et al., "SIP: Session Initiation Protocol," Network Working Group, Request for Comments 2543, pp. 1-143, Mar. 1999.

Donovan, S., "The SIP Info Method", Internet Engineering Task Force, pp. 1-5, Feb. 8, 1999.

Dalgic, et al., "True Number Portability and Advanced Call Screening in a SIP-Based IP Telephony System," IEEE Communications Magazine, pp. 96-101, Jul. 1999.

Cisco Systems, Inc., "Architecture for Voice, Video and Integrated Data," 2000, pp. 1-23.

Camarillo, et al., "The SDP Fid Attribute," Internet Engineering Task Force, Internet Draft, pp. 1-5, Apr. 2001.

* cited by examiner

SIP-BASED FEATURE CONTROL

This application is a continuation of U.S. application Ser. No. 09/436,793, filed on Nov. 8, 1999, now U.S. Pat. No. 6,615,236, the contents of which are hereby incorporated by reference in its entirety.

BACKGROUND OF THE INVENTION

1. Field of the Invention

The present invention relates generally to the field of Internet multimedia and single media communication, and, more particularly, to a method and system for providing feature-based services using the Session Initiation Protocol.

2. Description of the Related Art

The last twenty years have seen the Internet grow exponentially. From a tool for the technically savvy, the Internet has turned into one of the main communication means of a large segment of the general populace. As it has grown, other tools and technology, such as music and videos, have migrated to the computer-based medium.

One example of migrating technology is the movement of telephony services to the Internet. Internet telephony refers to a wide range of services, not merely the traditional telephone call. In general, it refers to the transport of real-time media, such as voice and video, over the Internet to provide interactive communication among Internet users. Users may access the Internet through a variety of means—a personal computer (PC), a stand-alone Internet Protocol (IP)-enabled device, or even by dialing up to a gateway from the handset of a traditional Public Switched Telephone Network (PSTN).

The advantages of IP telephony are quite sweeping. It offers high-quality voice communication, improved multiplexing gains, rich computer telephony integration, advanced services, an open market for providers, and reduced cost. Most of these advantages flow from the fact that IP telephony is packet-based, rather than circuit-based, like the present phone system. In a circuit-based communication, such as a phone call on traditional equipment, an actual connection is maintained between the caller and callee through switches and wires. In a packet-based communication, the communication itself is broken down into packets which are sent over a network. This allows for a more efficient use of resources. In addition, IP telephony uses mostly text-based protocols, which allows for easy implementation and debugging in languages such as Java, Tcl, and Perl. The layered protocols in IP telephony are also designed to operate independently of one another. This means that one can use the same higher-layer protocol in a wide range of devices, from cell and desktop telephones to TVs, stereos, and computers, because the lower, physical layers will take care of the differences.

Currently, traditional PSTN telephony uses SS7 (System Signalling 7) as the signalling protocol which establishes, controls, and tears down circuit connections. IP telephony uses SIP (Session Initiation Protocol, RFC 2543) as the signalling protocol for telephony, videoconferencing, and multimedia sessions. SIP provides for establishing and releasing connections.

The SIP protocol is a text-based protocol that works above the transport layer in the TCP/IP (Transport Control Protocol/Internet Protocol) stack. SIP can use any transport protocol, including TCP (Transport Control Protocol) and UDP (User Datagram Protocol) as its transport protocol. In addition, SIP can also work with ATM AAL5 (Asynchronous Transfer Mode ATM Adaption Layer 5), IPX (Internet Packet exchange), frame relay or X.25 transport protocols.

There are two components in a SIP network: network servers and user agents. A user agent is an end system that acts on behalf of someone who wants to participate in calls. In general, the user agent contains both a protocol client (a user agent client UAC) which initiates a call and a protocol server (user agent server UAS) which responds to a call (see FIG. 1). There are two different types of network servers as well: a proxy server, which receives requests, determines which server to send it to, and then forwards the request; and a redirect server, which receives requests, but instead of forwarding them to the next hop server, tells the client to contact the next hop directly.

The steps in initiating a session are fairly simple: as shown in FIG. 1, (1) the UAC sends an INVITE request to a SIP server, which in this case, is a proxy server. The SIP server will look in its database to determine where to send the INVITE request. Once that is determined, the proxy server sends the INVITE message to the appropriate next hop. In FIG. 1, the next hop is the callee, but, in reality, there could be a number of hops between the SIP server and the callee. If the SIP server was a redirect server, it would inform the UAC what the appropriate next hop is, and let the UAC do the rest. Once (2) the INVITE message finally reaches the callee UAS, (3) the callee UAS responds with an OK message, which (4) is forwarded to the caller UAC. When the caller UAC receives the OK message, indicating the callee has received the INVITE, (5) the UAC sends an ACK message, which, when (6) received, will start the session.

However, there are difficulties in migrating all the current services of traditional telephone networks to Internet telephony and SIP. In traditional networks, the Private Branch Exchange (PBX) is the cornerstone of business voice communication networking. For instance, all the employees at a business will have phones at their desk connected to a PBX, which routes the calls, handles voice mail, and offers other services. The replacement of traditional PBXs with IP-(Internet Protocol)-based PBXs will require that the users have the same services from their IP-enabled desktop telephone that they previously had from their traditional PBX telephone.

An example of the type of services traditional PBXs offer is the Do Not Disturb feature. Do Not Disturb (DND) is often implemented as a button that a user presses so that all calls will be automatically forwarded to the user's voice mailbox. In a traditional PBX, a DND command message is generally sent from the desktop device to the PBX, which then automatically forwards all calls to the voice mail system. But, in an SIP-based IP telephone network, the desktop telephone, or, more exactly, the user agent server UAS, would perform the forwarding. Although this works in many cases, it assumes the end client device (in this case, the SIP-based IP desktop telephone) has a DND capability, which is not assured. Therefore, there is a need for a system and method for traditional PBX services, such as the DND feature, in end client devices, such as SIP-based IP desktop telephones, without assuming the end client devices have this capability.

In addition, there are other features in traditional PBX systems that require the network server to be notified of status changes, especially when those changes affect the session/call setup handling for a user that has signed up for a network-based service. Examples include unconditional call forwarding, when the user wishes to forward all calls to another number/address; conditional call forwarding, when the user wishes to forward some calls under certain conditions; call blocking, when the user wishes to block certain addresses/numbers from being called; and call screening, when the user wishes to prevent calls from certain address/numbers from being received. Therefore, a need exists for a method and system for the user agent to notify the network server of feature status changes, such as DND, call forwarding, screening and blocking.

SUMMARY OF THE INVENTION

An object of the present invention is to provide a system and method which allows the network server in a SIP-based telephony network to perform all the functions of a traditional PBX system.

Another object of the present invention is to allow traditional PBX functions to be performed in a network, without requiring that the end client devices in that network be able to perform all of these functions.

A further object of the present invention is to provide a system and method for notifying network servers of changes to feature information for a particular user or device.

In order to fulfill these and other objects, the present invention provides an extension to the SIP protocol that would be used for notifying network servers of changes to feature information for a particular user or device. This extension, which consists of an extra field header called "Feature", would allow an end client to inform the network server of feature changes, rather than perform these features itself.

BRIEF DESCRIPTION OF THE DRAWINGS

The above and other objects, features and advantages of the present invention will become more apparent from the following detailed description when taken in conjunction with the accompanying drawing in which.

DETAILED DESCRIPTION OF THE PREFERRED EMBODIMENTS

Figure 1:
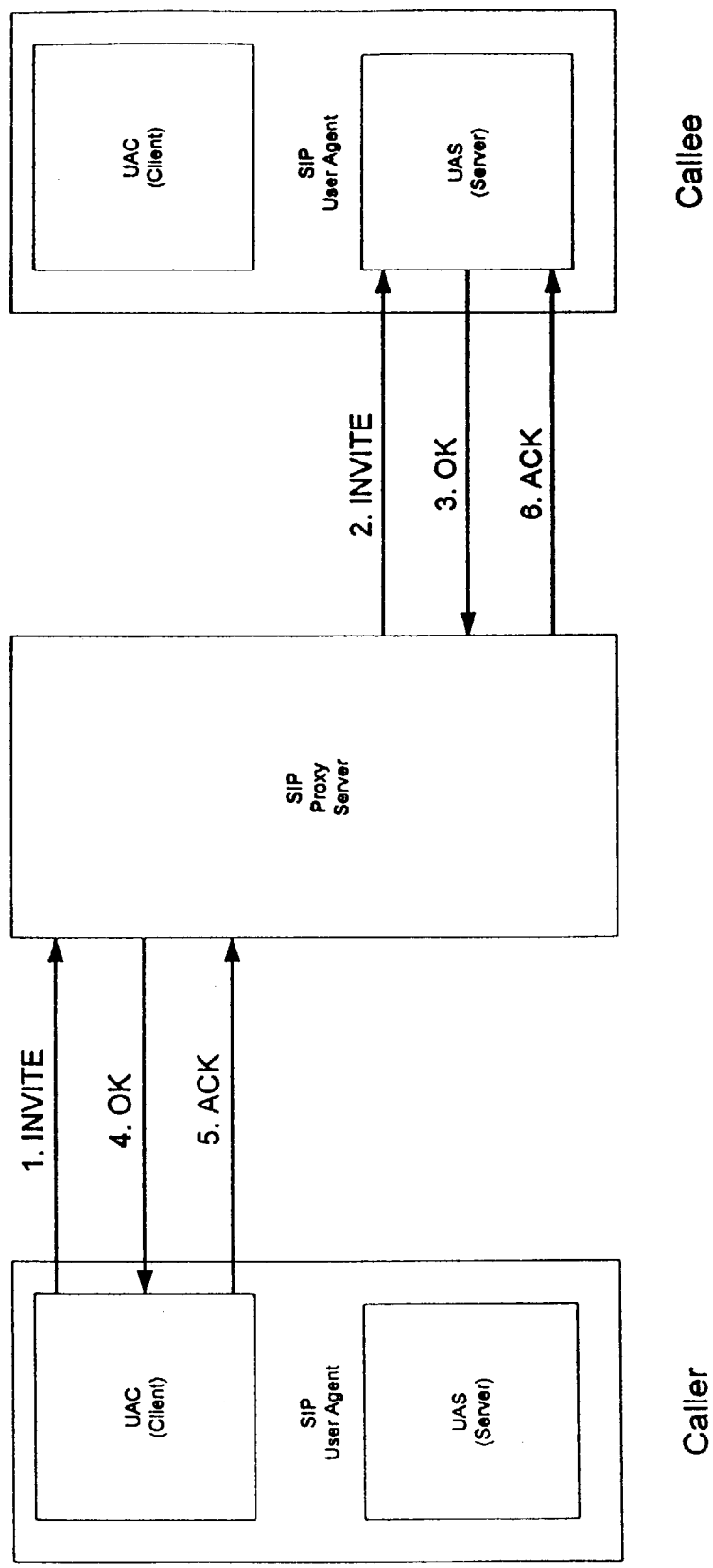
FIG. 1 shows the components of a SIP-based system and an overview of initiating a session.

In a traditional PBX system, when the end-user wanted to modify or begin use of a feature, such as DND, the telephone unit would send a message with special digits that indicated the feature control information. For instance, the DND button might send a "*720" message, which tells the PBX to activate the DND feature on that phone extension. Releasing the DND button might send a "@720" message, which tells the PBX to deactivate the DND feature on that phone extension.

The preferred embodiment of the present invention uses one of the message types (REGISTER) that already exists in SIP to send this type of feature control information. In order to do so, the preferred embodiment adds another field header to the REGISTER message, the "Feature" field header.

In order to more fully understand the preferred embodiment, a brief discussion of the various types of method messages in SIP is in order. INVITE and ACK are two method messages that were mentioned above; other method messages include OPTIONS, BYE, CANCEL, and REGISTER. The INVITE message indicates that the user or service is being invited to participate in a session. The ACK message confirms that the client has received a final response to an INVITE message. The OPTIONS message is a query to the server concerning the server's capabilities. The BYE message is used by the client to indicate to the server that it wishes to release or end the call. The CANCEL message is used to cancel a pending request.

The REGISTER message can be understood as a "log on" message, although it has many more uses. As an example, a desktop telephone could be designed with an "I'm here" button for indicating to the SIP server that the person is actually at that phone and ready to receive phone calls and other multimedia communications. This "I'm here" button would send a REGISTER message to the SIP server. That may or may not be followed up with a request for validation from the SIP server to ensure privacy. If it all works out, the SIP server will register that user and the user's address in the SIP server database, so that calls can be properly routed.

In general, registration either validates or invalidates a SIP user agent for user services provided by the SIP server. Additionally, the user agent provides one or more contact locations to the SIP server. An example of a REGISTER message, in which a user named "Barney" is using to log on to a SIP server, is below:

```
REGISTER sip:ss2.wcom SIP 2.0
Via: SIP/2.0/UDP there.com:5060
From: Barney <sip:UserB@there.com>
To: Barney <sip:UserB@there.com>
Call-ID: 123456789@there.com
CSeq: 1 REGISTER
Contact: Barney <sip:UserB@there.com>
Contact: sip:+1-972-555-2222@gw1.wcom.com;user=phone
Contact: tel: +1-972-555-2222
Authorization:Digest username=@UserB@,
realm=@MCI WorldCom SIP@,
nonce=@ea9c8e88df84f1cec4341ae6cbe5a359", opaque=@A,
uri=@sip:ss2.wcom.com@,
response=@dfe56131d1958046689cd83306477ecc@
Feature= dnd; status=active
Content-Length: 0
```

An exact description of the header fields is contained in RFC 2543, but such detail is unnecessary for complete understanding of the present invention. However, as an aside, the Authorization field header is used to validate that an authorized user is making the registration.

Figure 2:
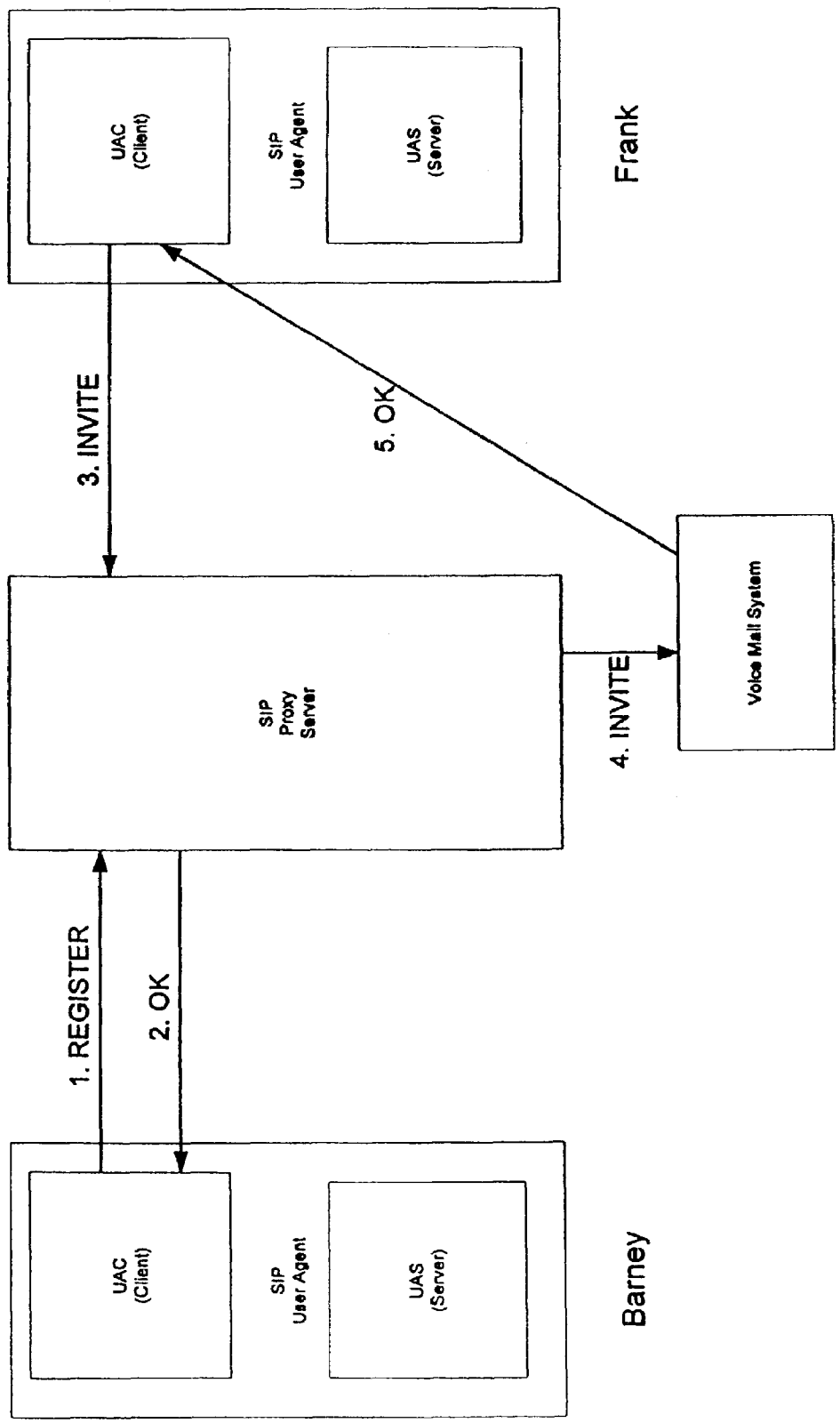
FIG. 2 shows a use of the REGISTER message according to an embodiment of the present invention.

In a preferred embodiment of the present invention, another field header is added to the REGISTER message that would carry feature control information. This would allow the REGISTER message to perform the additional functions required to emulate a traditional PBX system. For example, if the user in a IP-based PBX system pressed the DND button, a properly formatted REGISTER message is sent from the end client device, i.e., telephone, to the SIP Proxy Server, as shown by (1) in FIG. 2. The REGISTER message would have the following format (bold added to show new header):

```
REGISTER sip:ss2.wcom SIP 2.0
Via: SIP/2.0/UDP there.com:5060
From: Barney <sip:UserB@there.com>
To: Barney <sip:UserB@there.com>
Call-ID: 123456789@there.com
CSeq: 1 REGISTER
Contact: Barney <sip:UserB@there.com>
Contact: sip:+1-972-555-2222@gw1.wcom.com;user=phone
Contact: tel: +1-972-555-2222
Authorization:Digest username= "UserB", realm= "MCI WorldCom SIP",
nonce= "ea9c8e88df84f1cec4341ae6cbe5a359", opaque=""
uri= "sip:ss2.wcom.com",
response= "dfe56131d1958046689cd83306477ecc"
Feature=dnd; status=active
Content-Length: 0
```

This Feature field entry would tell the SIP server to change the "dnd" feature status to "active". Thus, the SIP server would know to send all incoming calls for Barney to Barney's voice mail box. This allows the user agent client UAC to be "thin": in other words, the user agent client will not have to add all the PBX features to its own protocol. Instead, the user agent client (in our example, an IP-based desktop telephone) will simply tell the network server to provide the feature. When the SIP server has appropriately updated its tables and database, the SIP server sends (2) an OK message to the user agent client UAC to confirm that the feature status information has been updated. The OK message would have the following format (bold added to show new header):

```
SIP 2.0 200 OK
Via: SIP/2.0/UDP there.com:5060
From: Barney <sip:UserB@there.com>
To: Barney <sip:UserB@there.com>
Call-ID: 123456789@there.com
CSeq: 1 REGISTER
Contact: Barney <sip:UserB@there.com>
Contact: sip:+1-972-555-2222@gw1.wcom.com;user=phone
Contact: tel: +1-972-555-2222
Feature= dnd; status=active
Content-Length: 0
```

When (3) someone attempts to call Barney, such as Frank, who happens to be using a SIP-enabled client device, the SIP server will refer to its updated tables and database and find that Barney wishes his messages to be entered into the voice mail system. The SIP server will then (4) redirect the incoming call to the voice mail messaging system.

Then the (5) voice mail system will send an OK message to Frank in order to initiate a connection.

When using features such as call forwarding, screening or blocking, the Feature field entry would contain additional information. For instance, if the activated feature was call screening, the Feature field entry could appear as:

Feature=screen; status=active; tel: +1-972-555-1212

The REGISTER message containing this Feature field entry would instruct the SIP server to activate call screening and prevent the telephone number 1-972-555-1212 from calling the user. Clearly, other features may require more or less information, depending on the function that the SIP server will be required to perform.

The solution provided by the preferred embodiment is both easier to implement than traditional message handling, such as performed in a PBX system, and easier to understand. Furthermore, it's more intuitively obvious what "dnd; status=active" means, than the traditional "720".

While the present invention has been described in detail with reference to the preferred embodiment, it is a mere exemplary application. Thus, it is to be clearly understood that many variations can be made by anyone skilled in the art within the scope and spirit of the present invention.

What is claimed is:

1. A method for providing features in a Session Initiation Protocol (SIP) based network, comprising:
   receiving, by at least one SIP server, a SIP register message from a first user device, the SIP register message including feature status information associated with a first feature to be performed for calls directed to the first user device or calls transmitted from the first user device, the first feature comprising at least one of a do not disturb feature, call forwarding, call blocking or call screening; and
   implementing the first feature according to the feature status information in said SIP register message.

2. The method of claim 1, wherein the feature status information is included in a header field of the SIP register message.

3. The method of claim 1, wherein the first feature comprises a do not disturb feature.

4. The method of claim 1, wherein the first feature comprises call forwarding.

5. The method of claim 1, wherein the first feature comprises call blocking.

6. The method of claim 1, wherein the first feature comprises call screening.

7. The method of claim 1, wherein the implementing comprises:
   storing information in the at least one SIP server with respect to the first feature.

8. The method of claim 7, further comprising:
   receiving, by the at least one SIP server, an invite message from a second user device, the invite message being intended for the first user device; and
   forwarding the invite message to at least one of a voice mail system or another network location based on the stored information.

9. A server, comprising:
   a memory; and
   logic configured to:
      receive session initiation protocol (SIP) messages, at least one of the SIP messages comprising a SIP register message including information associated with a first feature requested by a first user, the first feature comprising at least one of a do not disturb feature, call forwarding, call blocking or call screening,
      store information corresponding to the first feature for the first user in the memory, and
      process calls using the stored information to provide the first feature.

10. The server of claim 9, wherein the memory is configured to store feature information for a plurality of users.

11. The server of claim 9, wherein the SIP register message includes information indicating whether to at least one of activate and deactivate the first feature.

12. The server of claim 9, wherein the first feature comprises a do not disturb feature and when processing calls intended for the first user, the logic is configured to:
   automatically forward calls intended for the first user to a voice mail system.

13. The server of claim 9, wherein the first feature comprises call forwarding and when processing calls intended for the first user, the logic is configured to:
   automatically forward calls intended for the first user to another network location.

14. The server of claim 9, wherein the first feature comprises conditional call forwarding and when processing calls intended for the first user, the logic is configured to:
   forward at least some of the calls intended for the first user to another network location based on the stored information associated with the first user.

15. The server of claim 9, wherein the first feature comprises call blocking, and when processing calls from the first user, the logic is configured to:
   determine whether to prevent a call from being completed based on the stored information.

16. The server of claim 9, wherein the first feature comprises call screening and when processing calls intended for the first user, the logic is configured to:
   prevent at least some of the calls from being received by the first user based on the stored information.

17. A user device configured to communicate in a session initiation protocol (SIP) based network, comprising:
- at least one user agent configured to:
  - generate SIP messages, a first one of the SIP messages comprising a register message including feature status information identifying a first feature that a user associated with the user device wishes to implement, the first feature comprising at least one of a do not disturb feature, call forwarding, call blocking or call screening, and
  - transmit the first SIP message to a SIP server.

18. The user device of claim 17, wherein the feature status information is included in a header of the register message.

19. The user device of claim 17, wherein the feature status information comprises a do not disturb activation request.

20. The user device of claim 17, wherein the feature status information comprises an unconditional call forwarding activation request, the unconditional call forwarding activation request including at least one of a number or address to which calls intended for the user device are to be forwarded.

21. The user device of claim 17, wherein the feature status information comprises a conditional call forwarding activation request, the conditional call forwarding activation request including at least one of a number or address to which at least some calls intended for the user device are to be forwarded.

22. The user device of claim 17, wherein the feature status information comprises a call blocking activation request, the call blocking activation request including at least one of a number or address to which calls from the user device are not permitted.

23. The user device of claim 17, wherein the feature status information includes a call screening activation request, the call screening activation request including at least one of a number or address from which calls intended for the user device are prevented from being received.

24. The user device of claim 17, wherein the at least one user agent is part of a SIP-based telephone.

25. A computer-readable medium having stored thereon a data structure for use in a Session Initiation Protocol (SIP) based network for providing call related services to at least one user, the data structure comprising:
- a SIP register message;
- a user identification field for identifying a sender; and
- a feature control field configured to include feature status information, the feature status information corresponding to a requested call related service to be provided for the at least one user, wherein the feature status information includes at least one of a do not disturb activation request, an unconditional call forwarding activation request, a conditional call forwarding activation request, a call blocking activation request or a call screening activation request.

* * * * *